United States Patent [19]

Hamed

[11] Patent Number: 4,606,877

[45] Date of Patent: Aug. 19, 1986

[54] MONOMER-PLASTICIZED ELASTOMERS AND PROCESS FOR PRODUCING SAME

[75] Inventor: Parviz Hamed, Framingham, Mass.

[73] Assignee: Stowe Woodward Company, Southborough, Mass.

[21] Appl. No.: 722,374

[22] Filed: Apr. 12, 1985

Related U.S. Application Data

[62] Division of Ser. No. 626,711, Jul. 2, 1984, Pat. No. 4,530,944, which is a division of Ser. No. 422,278, Sep. 23, 1982, Pat. No. 4,485,198.

[51] Int. Cl.[4] .............................................. B29B 13/00
[52] U.S. Cl. .................................. 264/271.1; 264/295
[58] Field of Search ............................. 264/295, 271.1

[56] References Cited

U.S. PATENT DOCUMENTS

| | | | |
|---|---|---|---|
| 2,522,136 | 9/1950 | Schaffer | 525/232 |
| 3,899,564 | 8/1975 | Kessler | 264/295 |
| 4,242,296 | 12/1980 | Bricker | 264/295 |

*Primary Examiner*—Jacob Ziegler
*Attorney, Agent, or Firm*—Pahl, Lorusso & Loud

[57] ABSTRACT

Elastomers are plasticized with a polymerizable monomer, in homogeneous admixture therewith, by adding the monomer to a latex of the elastomer, free of polymerization initiator, followed by coagulation of the monomer and polymer solids. The coagulated solids recovered from the latex may be compounded with a polymerization initiator for the monomer and a vulcanizing agent for the polymer and, optionally, an inorganic filler, and shaped into the desired product form. Polymerization of the polymer and vulcanization of the elastomeric polymer are initiated after shaping.

12 Claims, No Drawings

MONOMER-PLASTICIZED ELASTOMERS AND PROCESS FOR PRODUCING SAME

This is a division of application Ser. No. 626,711 filed July 2, 1984 now U.S. Pat. No. 4,530,944 which in turn is a division of U.S. application Ser. No. 422,278 filed Sept. 23, 1982 now U.S. Pat. No. 4,485,198.

BACKGROUND OF THE INVENTION

1. Field of the Invention

This invention relates to homogeneous monomer-containing vulcanizable compositions derived from rubber latices, to processes for their preparation, and to covers of the vulcanized compositions for rolls of the types employed in the papermaking and textile industries.

2. Description of the Prior Art

Rolls having a metallic core with a relatively hard elastomeric covering have long been used in machinery for the making, handling and processing of lengths of paper and textiles. Where high roll pressures are employed, deformation of the elastomeric covering generates heat which may elevate the temperature within the cover to temperatures as high as about 200° F. Service under such conditions of pressure and temperature will eventually lead to fatigue problems often seen as separation of the cover from the core and as cracks at the surface of the elastomer cover. Fillers and fiber reinforcement represent the conventional approaches to controlling fatigue in the roll cover.

In addition to resistance to fatigue such roll covers should have high abrasion resistance. Abrasion is a problem, for example, in the press section of papermaking machinery where rubber covered rolls press the wet paper web, which web typically contains abrasives inadvertently introduced with the pulp as well as abrasives intentionally added to the paper stock as fillers. Copolymers of butadiene and acrylonitrile are noted for their hardness and have been used in many applications where high resistance to abrasion is required.

The abrasion resistance of rubbers generally increases with increasing molecular weight. However, viscosity of the unvulcanized rubber also increases with increase in molecular weight. Accordingly, in conventional practice a plasticizer ("extending oil") is added to the unvulcanized rubber to lower its viscosity and to increase its workability to a point suitable for extrusion or other processing. In the case of acrylonitrile/butadiene (nitrile) rubbers, however, the addition of plasticizers has proven difficult in practice.

U.S. Pat. No. 4,143,092 and Encyclopedia of Polymer Science and Technology (Vol. 2, p. 705) note that only a limited number of "extending oils" or "plasticizers" are compatible with acrylonitrile/butadiene rubber, the majority of conventional plasticizers tending to ooze from the surface of the rubber as if from a fine-pored sponge. The patent further teaches that ester plasticizers, such as dioctyl phthalate, dibutyl phthalate dioctyl adipate, etc., while compatible with the rubber, are susceptible to leaching by ink vehicles and roll cleaning compounds. Similar leaching of the conventional ester plasticizers has now been noted to occur in applications in the papermaking and textile industries. For example, in the conventional papermaking processing bleaching agents and defoamers are commonly added to the paper stock. These agents as well as coating agents, waterproofing agents, etc., used to treat the formed paper are all potential leachants. Additionally, textile and papermaking rolls are conventionally cleaned with aromatic compounds such as kerosene which are also solvents for many conventional plasticizers.

Kent et al in U.S. Pat. No. 3,528,936 and Cowperthwaite et al in U.S. Pat. No. 3,751,378 recognize that high molecular weight polymers of butadiene, etc., may be plasticized by addition of certain polyester monomers. Both patents teach admixture of the monomer and polymer together with an inorganic filler and other ingredients on an open mill or in an internal mixer, i.e., "dry" blending with a filler. In these prior art dry blending processes, a homogeneous admixture of monomer in polymer is impossible without the inorganic filler which serves as a carrier for the monomer and as a dispersant.

SUMMARY OF THE INVENTION

It has now been discovered that an elastomeric polymer may be plasticized with polymerizable monomer, in homogeneous admixture therewith, by adding the monomer to a latex of the polymer and coagulating the solids to form the homogeneous admixture. It has been further discovered that the plasticized elastomeric compositions so produced have more uniform consistency, i.e., a greater degree of homogeneity, than do similar compositions prepared by dry blending the polymer and monomer utilizing an inorganic filler to introduce the monomer into the polymer.

More specifically, the present invention provides a monomer-plasticized, non-crosslinked elastomeric composition in the form of a homogeneous admixture of elastomeric polymer and a polyfunctional polymerizable monomer, free of inorganic filler. These non-crosslinked compositions have low viscosity with little or no cold-flow. The plasticized elastomeric compositions may be produced by admixing 5.0–100 parts by weight of the polymerizable monomer with 100 parts by weight (solids basis) of a latex of the elastomeric polymer and then coagulating the solids in the latex, inclusive of the monomer and polymer, in a conventional manner. The coagulated solids are separated from the aqueous phase of the latex to provide the homogeneous elastomeric composition of the invention. The admixing, coagulating and recovery steps are all conducted in the absence of a polymerization initiator, catalyst, polymerizing radiation, etc., and under conditions whereby substantially no grafting or crosslinking of the elastomer occurs and substantially no polymerization of the monomer occurs. Accordingly, the solids admixture recovered from suspension by coagulation consists essentially of a completely homogeneous admixture of (1) substantially ungrafted, uncrosslinked elastomer and (2) unpolymerized monomer.

The plasticizing effect of the monomer becomes evident upon addition of 5–10 parts by weight (in some cases more) of the monomer to 100 parts by weight of the elastomer, depending on the nature of the monomer and that of the elastomer. A marked effect on cold-flow characteristics may be seen upon admixture of as little as 0.5 parts by weight monomer to 100 parts by weight polymer.

A further aspect of the invention involves compounding the non-crosslinked elastomeric composition, containing the polymer and monomer in homogeneous admixture, with a vulcanizing agent for the elastomeric polymer and a polymerization initiator for the polyfunctional monomer. Normally, the same free radical producing compound is employed as both the vulcanizing agent and the polymerization initiator. For the manufacture of rubber-covered rolls, the aforementioned ingredients are further compounded with an inorganic filler and the roll core is covered with the compounded composition in a conventional manner and then heated to effect polymerization of the monomer and vulcanization of the elastomeric polymer. The present invention is founded, in part, on recognition that the conventional prior art admixtures, upon vulcanization, provide products characterized by a two-phase morphology in which areas of homopolymer (derived from the polyfunctional monomer) are dispersed through the copolymer. This two-phase morphology is believed to be attributable to the competing affinities of monomer to filler, polymer to filler and monomer to polymer. It has been discovered that fatigue problems seen in the vulcanized products, e.g., surface cracking of roll covers, are attributable in large measure of the presence of the homopolymer phase and to its nonuniform distribution through the rubber phase. Due to the difference between the glass transition temperatures of the homopolymer and rubber phases, the coefficients of linear expansion of the two phases differ, resulting in stresses within areas of high homopolymer concentration in the vulcanized products. It has been further discovered that the degree of consistency necessary to avoid such fatigue problems in the vulcanized product are obtained only with great difficulty, if at all, using the conventional techniques for compounding, i.e., dry blending. In contrast, the present invention provides a homogeneous single-phase product.

An important aspect of the invention is that polymerization of the monomer should not be initiated prior to shaping. Accordingly, the admixture recovered by coagulation will be free of any polymerization initiator for the monomer. If polymerization of the monomer, grafting or cross-linking is initiated prior to shaping, the objectives of the present invention of providing a high molecular weight polymer, plasticized to provide a highly workable vulcanizable composition, will be frustrated.

Polyfunctional monomers, especially trifunctional monomers, are preferred for use in the present invention because of their lower vapor pressure and volatility and because they yield vulcanized products of higher hardness and rigidity. The preferred compositions are copolymers of butadiene and acrylonitrile plasticized with an acrylic or methacrylic acid ester of a polyol.

The term "high molecular weight" as used herein to describe the elastomeric polymers has reference to a number average molecular weight of about 20,000 to 70,000 for synthetic elastomers and higher for natural rubbers.

The term "latex" as used herein is not limited to aqueous dispersions of the elastomeric polymer but, rather, is intended to include similar dispersions in other liquid mediums.

Accordingly, it is an object of the present invention to produce an unvulcanized synthetic rubber composition of high molecular weight yet having sufficiently low viscosity and good processability that it is suitable for the production of products such as roll covers by utilizing conventional rubber mixing equipment such as mills and extruders.

It is a further object of the invention to provide such an unvulcanized composition of high molecular weight admixed with the viscosity reducing extender or plasticizer which is completely homogeneous and thereby yields a finished product free of areas possessing differing coefficients of linear expansion, i.e., a single-phase product.

It is yet a further object of the invention to provide such a rubber admixture wherein the plasticizer extender is of a nature which is fully compatible with the synthetic rubber yet resists extraction from the finished product by solvents to which it might be exposed in various applications in the papermaking and textile industries.

Yet a further object of the invention is to provide a rubber cover for a roll which exhibits a high degree of abrasion resistance yet maintains a smooth surface over extended periods of service.

Yet a further object of the invention is to provide a cured rubber cover which maintains a smooth surface by resistance to deformation and/or cracking due to fatigue and/or hardening.

Other objects and further scope of applicability of the present invention would become apparent from the detailed description to follow.

DESCRIPTION OF THE PREFERRED EMBODIMENTS

Polymerizable monomers suitable for use in the present invention include conventional monofunctional monomers such as acrylonitrile, alkyl acrylates and methacrylates, acrylic acid, methacrylic acid, vinyl chloride, styrene, olefins such as ethylene and propylene, vinyl acetate, etc. However, for the previously noted reasons, polyfunctional, especially trifunctional, monomers are preferred.

The polyfunctional polymerizable monomers of the invention are of the type conventionally used as cross-linking agents and include, for example, allylic compounds such as triallyl chloride, allyl methacrylate, diallyl fumarate, triallyl cyanurate or methallyl polyesters, glycidyl methacrylate, diepoxides, divinyl benzene, divinyl esters, vinyl crotonate, dicrotonates, divinyl carbinol, diamines and similar compounds. The preferred monomers are polyesters having 2 to 4 ester groups and at least two independently polymerizable, ethylenically unsaturated groups. The term "polyester" includes di-, tri- and tetra-esters of polyhydric alcohols with unsaturated carboxylic acid as well as polyesters of polybasic acids with unsaturated alcohols. The polyester contains at least two carbon-to-carbon double bonds which are separated by at least one carbon atom and preferably are of the vinylidene type $>C=CH_2$.

The most preferred monomers used in the present invention are acrylic or methacrylic acid esters of polyols. Such acrylic and methacrylic esters include:
1,4-butylene glycol dimethacrylate;
1,3-butylene glycol dimethacrylate;
1,3-butylene glycol diacrylate;
triethylene glycol diacrylate;
trimethylol propane trimethacrylate;
trimethylol propane triacrylate;
ethylene glycol dimethacrylate;
2-butene-1,4-diol-dimethacrylate;
hexanediol diacrylate;
tetraethylene glycol dimethacrylate;
pentacrythritol tetra-methacrylate;
glycerol trimethacrylate;
glycerol triacrylate;
trimethylol ethane trimethacrylate;
trimethylol ethane triacrylate; etc.

Typical of such di- and tri-ester acrylic and methacrylic monomers which are commercially available as CHEMLINK 27A (1,3-butyleneglycol dimethacrylate) and CHEMLINK 30A (trimethylol propane trimethacrylate) marketed by Ware Chemical Company and SARET 500 (trimethylol propane trimethacrylate) marketed by the Sartomer Company.

As previously noted, the present invention contemplates the addition of the aforementioned monomer to an aqueous latex of any synthetic or natural rubber. Latices of nitrile rubbers, i.e., copolymers of butadiene and acrylonitrile, are especially preferred for the abrasion-resistance of the vulcanized products derived therefrom. The butadiene:acrylonitrile copolymers ordinarily contain from about 18 to 45% by weight of acrylonitrile, the balance being butadiene. Among the commercially available materials which are suitable for use in the present invention are the various copolymers available from the Goodrich Chemical Company under the general trade designation "HYCAR" or from Goodyear under the general trade designation "CHEMIGUM".

Especially preferred for purposes of the present invention are latices of carboxylated copolymers of butadiene and acrylonitrile. These are properly considered tripolymers of butadiene, acrylonitrile and acrylic of methacrylic acid. Examples of the commercially available carboxylated nitrile rubber latices are HYCAR 1072 (Bd/ACN=65/34, with 1% carboxylic acid) marketed by B. F. Goodrich and CHEMIGUM NX-775 (Bd/ACN-55/38, with 7% carboxylic acid) marketed by the Goodyear Tire and Rubber Company. These carboxylated copolymers contain approximately 0.5–10% by weight terminal carboxyl groups. In the present invention the carboxylated nitrile rubbers are preferred over other nitrile rubbers because the presence of the carboxylic groups changes the mechanism of the cure in a favorable manner to give a very high gum strength and a tensile strength on the order of 4000–4500 psi.

To produce the plasticized, non-crosslinked workable compositions of the present invention, 5.0–100 parts by weight of the polyfunctional polymerizable monomer are added to 100 parts by weight (solids basis) of the synthetic or natural rubber latex. A preferred range is 40–60 parts by weight monomer to 100 parts by weight of the elastomeric polymer. A particularly preferred ratio for nitrile rubbers is 40 parts by weight monomer to 100 parts by weight rubber. In the absence of a polymerization initiator no polymerization of the monomer or crosslinking of the elastomeric polymer occurs and, as a result, the composition retains low viscosity and good processibility.

After mixing to obtain a homogeneous admixture in aqueous suspension, the solids, inclusive of the monomer and polymer which have undergone no interreaction at this point in processing, are coagulated in a conventional manner. For this purpose a rosin acid, fatty acid or salt is added to the latex. A rosin acid is the preferred coagulant for synthetic rubbers because it imparts tack to the polymer. The coagulated solids consisting of the unreacted monomer and polymer are then separated from the aqueous phase of the latex and recovered as a homogeneous admixture. By virtue of the admixing of the monomer and polymer in an aqueous suspension, a high degree of uniformity of distribution of the monomer throughout the polymer is obtained.

The coagulated solids recovered from the latex, including the monomer and the elastomeric polymer, may be washed and dried and are then compounded with a free radical polymerization initiator which serves not only as a polymerization initiator for the monomer but also as a vulcanizing agent for the rubber. Although it is possible to use any free radical producing substance such as barium peroxide, potassium persulphate, bisazoisobutyronitrile, it is preferred to employ organic peroxides such as dicumyl peroxide, benzoyl peroxide, lauroyl peroxide, butyl perbenzoate, that have a half-life greater than 10 hours at the temperature of mixing and are easily miscible or dispersible in the mixture of elastomeric polymer and polyfunctional monomer.

Certain rubbers, such as the butyl rubbers, cannot be vulcanized by free radical initiators alone. Accordingly, vulcanizable compositions of the present invention which contain such rubbers must be compounded not only with a free radical producing compound but also with a sulfur vulcanization system. Where a sulfur vulcanization system is necessary, sulfur, a metal oxide (e.g., zinc oxide or zinc peroxide) and a vulcanization promoter or accelerator are compounded with the non-crosslinked vulcanizable composition, along with the free radical polymerization initiator. Generally the accelerator is present in the quantity from 0.1 to 30 parts per 100 parts of the elastomeric polymer. Suitable accelerators include inorganic accelerators, such as lime and lead oxide and organic accelerators, such as mercaptobenzothiozole, benzothiazyl disulfide, tetramethyl thiuram monosulfide, zinc dibenzyl dithiocarbamate, zinc dibutyl dithiocarbamate, butylaldehyde analine, diphenyl guanidine and diorthotoly guanidine.

Carbon black or non-black inorganic fillers may also be admixed with the unvulcanized compositions of the present invention. The preferred non-black inorganic fillers include the carbonates such as calcium carbonate, diatomaceous earth, talc, clays, silicates, silicas, silicoaluminates, the various surface treated or coated clays, carbonates and silicas, and mixtures thereof. Also included in such fillers are the lubricating or friction-reducing fillers such as the platey graphites, which may be used alone or in combination with non-black fillers. Preferably, where a carboxylated Bd/ACN copolymer is to be used for a roll cover, the quantity of filler used is from 0 parts to 200 parts by weight per 100 parts by weight of the monomer plasticized polymer.

Conventional antioxidants are also included in the vulcanizable compositions, as they are a standard additive in the commercial rubber latices.

In forming a roll cover in accordance with the present invention the roll core, appropriately cleaned and optionally wrapped with a layer of fiber or fibrous reinforced resin, is rotated about its axis and the unvulcanized composition, compounded as described above, is extruded as a continuous strip onto the rotating roll surface, for example as depicted by Hess et al in U.S. Pat. No. 3,698,053. The cover thus formed is then vulcanized under appropriate heat and pressure. During this vulcanization polymerization of the monomer also occurs.

EXAMPLE 1

(Uncured, Non-Crosslinked Rubber/Monomer Blend)

Two formulations "A" and "B" were prepared as follows:

| Ingredients | A (parts by wt) | B (parts by wt) |
|---|---|---|
| Bd/ACN Copolymer (Goodyear N318B Bd/ACN = 55/45) | 100 | 100 |
| Trimethylol Propane Trimethacrylate (Monomer) (CHEMLINK-30) | 67 | 40 |
| Alkylbenzene Sulfonate Anionic Emulsifier | 1-1.5 | 1-1.5 |
| Water | 180 | 180 |
| Antioxidant (DIONAX) | 1.5 | 1.5 |
| Time | 0.5 hrs | 0.5 hrs |
| Temperature | 50° F. | 50° F. |

The latex emulsion was continuously mixed over the half hour period using 16 ounces Crown Cap bottles in a shaker. At the end of one-half hour of TREHNIC, a rosin acid coagulant was added to each formulation. The coagulated solids were then separated from aqueous phase, washed and dried. The dried solids were then tested in a Model ST-1 Mooney Viscometer (Scott Tester, Inc.). Formulation A was found to have a Mooney viscosity of 27 and formulation B a Mooney viscosity of 57.

EXAMPLE 2

(Uncured, Non-Crosslinked Rubber/Monomer Blend)

The following formulations C, D, E, F, G and H were prepared in a manner similar to A and B, above but using a carboxylated copolymer as the elastomeric polymer.

| Ingredients (parts by wt) | C | D | E | F | G | H |
|---|---|---|---|---|---|---|
| Carboxylated BN/ACN Copolymer CHEMIGUM NX-775 | 100 | 100 | 100 | 100 | 100 | 100 |
| CHEMLINK 30 | 20 | 30 | 0 | 40 | 60 | 0 |
| Water | 180 | 180 | 180 | 180 | 180 | 180 |
| DIONAX | 1.5 | 1.5 | 1.5 | 1.5 | 1.5 | 1.5 |
| Time (Hours) | 0.5 | 0.5 | 0.5 | 0.5 | 0.5 | 0.5 |
| Temperature | 50° F. | 50° F. | 50° F. | 50° F. | 50° F. | 50° F. |
| Mooney Viscosity (ML/4) | 50.0 | 43.5 | 114 | 44.5 | 22.5 | 136 |
| Barbender Heat Stability at 325° F. (100 Meter Torque/gm Risc min) | 13 | 30 | 12 | 24 | 30 | 12 |

As in the preparation of formulations A and B, the emulsion admixtures were continuously mixed over the half hour period using the aforementioned shaking apparatus. At the end of the half hour period, TRENIC coagulant was added. The dried, coagulated solids were tested in a Mooney Viscometer (Scott Tester, Inc.).

In the above formulations, C, D and E employed the same carboxylated copolymer. While F, G and H also employed the same CHEMIGUM NX-775, it was a batch of slightly higher molecular weight than that used for C, D and E, as reflected by the higher Mooney viscosity for H versus E.

EXAMPLE 3

(Cured Compositions)

The formulations of the above Example were each mixed (in a Schold mixer) with the following curatives and filler:

| | |
|---|---|
| 5 parts by weight/100 parts rubber | Zinc Oxide |
| 5 parts by weight/100 parts rubber | DICUP 40 KE (40% active Dicumyl peroxide) |
| 50 parts by weight/100 parts rubber | HISIL 233 (silica filler) |

The admixed formulations were then placed in a mold and cured at 325° F. with the following results:

| Cure Data | C | D | E | F | G | H |
|---|---|---|---|---|---|---|
| T$_2$ Minute | 1.0 | 0.9 | 1.75 | 0.9 | 0.9 | 1.6 |
| T$_{90}$ Minute | 7.5 | 4.85 | 15.25 | 5.6 | 9.5 | 15.5 |
| T$_{95}$ | 10.6 | 7.25 | 19.5 | 8.5 | 5.75 | 20.0 |
| T$_{max}$ Torque | 148.6 | 150.8 | 96 | 142.0 | 119.0 | 91.5 |
| Cure at 325° F. | | | | | | |
| Minutes | 8 | 5 | 15 | 6 | 10 | 15 |
| Tensile | 2200 | 2200 | 1200 | 2700 | 3500 | 1400 |
| Elong % | 90 | 110 | 250 | 60 | 20 | 260 |
| Mooney Stability at 158° F. 7 days and 14 days | | | | | | |
| ML/4 7 days aging | 46 | 40 | 120 | 43 | 25 | — |
| ML/4 14 days aging | 48.5 | 40 | 150 | 45 | 27 | — |
| Uncured Tg °C. | −28 | −33 | −21 | −35 | −41 | −18 |
| Cured Tg °C. | −13 | −21 | −16 | −15 | −15 | −18 |

EXAMPLE 4

This example was designed to compare the wet-blending technique of the present invention with the conventional prior art dry-blending technique. The following two formulations were blended in a Schold Mixer:

| Ingredients (pts by wt) | I (present invention) | J (prior art) |
|---|---|---|
| Monomer/Elastomer Blend "F" of Example 2 | 140 | — |
| Rubber (CHEMIGUM NX-775) | — | 100 |
| Monomer (CHEMLINK 30) | 4 | 44 |
| Zinc Oxide | 5 | 5 |
| Antioxidant (FLECTOL H) | 3 | 3 |
| Stearic Acid | 1 | 1 |
| FEF Carbon Black | 40 | 40 |
| Dicumyl Peroxide | 2.5 | 2.5 |
| Wax | 3.0 | 3.0 |
| Bismelamide | 2.0 | 2.0 |
| Silane Treated Clay | 40.0 | 40.0 |

The curing characteristics and properties were as follows:

|  | I | J |
|---|---|---|
| Hardness (P & J) | | |
| 90' at 306° F. | 6 | 7 |
| 180' at 306° F. | 6 | 6 |
| Mooney Scorch at 275° F. | | |
| T₅ | 3.6 | 6.4 |
| Min. Viscosity | 27 | 12 |
| Rheometer at 280° F. | | |
| T₂ | 5.5 | 6 |
| T₉₀ | 23 | 29 |
| Min. Torque | 5 | 2 |
| Max. Torque | 87 | 84 |
| Stress-Strain 0° Test Orientation | | |
| Tensile Strength (psi) | 4300 | 3900 |
| % Elongation | 19 | 20 |
| Stress-Strain 90° Test Orientation | | |
| Tensile Strength (psi) | 4600 | 4000 |
| % Elongation | 17 | 19 |

| | Dynamic Properties | | | |
|---|---|---|---|---|
| | I | | J | |
| Temp °F. | Vol. Hyst. | Dyn. E | Vol. Hyst. | Dyn. E |
| (600 psi Stress) | | | | |
| 80 | 1.57 | 106060 | 2.44 | 95140 |
| 100 | 1.87 | 91930 | 2.57 | 79930 |
| 150 | 2.73 | 63360 | 3.92 | 54100 |
| 200 | 3.94 | 44420 | 4.85 | 38730 |
| 250 | 5.61 | 32110 | 6.61 | 28470 |
| 300 | 7.48 | 24320 | 8.41 | 22310 |
| (800 psi Stress) | | | | |
| 80 | 2.69 | 108710 | 3.79 | 93900 |
| 100 | 3.23 | 93640 | 4.47 | 79300 |
| 150 | 5.17 | 61110 | 7.12 | 52230 |
| 200 | 7.32 | 43710 | 9.77 | 37110 |
| 250 | 10.36 | 31250 | 12.20 | 27900 |
| 300 | 13.52 | 24300 | 15.44 | 22090 |
| (1000 psi Stress) | | | | |
| 80 | 4.12 | 110210 | 6.46 | 90100 |
| 100 | 4.86 | 93550 | 7.42 | 79720 |
| 150 | 7.98 | 61230 | 9.19 | 53900 |
| 200 | 11.42 | 43820 | 14.15 | 36880 |
| 250 | 17.44 | 29480 | 19.46 | 28010 |
| 300 | 24.62 | 22660 | 24.53 | 22310 |

| Hydrolytic Stability (7 days at 212° F. Tap Water) | | |
|---|---|---|
| | I | J |
| % Weight Increase | 3.06 | 2.0 |
| % Volume Increase | 3.22 | 1.92 |
| Hardness Change (P & J) | +3 | +2 |

| Solvent Stability (7 days at 158° F. Kerosene/Water 50/50) | | |
|---|---|---|
| | I | J |
| % Weight Increase | 2.84 | 3.40 |
| % Volume Increase | 3.66 | 4.53 |
| Hardness Change (P & J) | +5 | +6 |

| Hardness Stability (P & J) | | |
|---|---|---|
| | I | J |
| Hardness at RF | 8 | 8 |
| 100° F. | 10 | 10 |
| 125° F. | 12 | 12 |
| 150° F. | 14 | 14 |
| 175° F. | 15 | 14 |
| 200° F. | 15 | 14 |
| 225° F. | 15 | 14 |
| 250° F. | 15 | 15 |
| Δ(P & J) | +7 | +7 |

In the Pico abrasion test compositions I and J showed a % relative index of 322 and 245, respectively. Thus, composition I was found to have a significantly higher abrasion resistance.

The invention may be embodied in other specific forms without departing from the spirit or essential characteristics thereof. The foregoing embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process to form a cover on a metal core comprising:
   providing 100 parts by weight, solids basis, of a latex of an elastomeric polymer;
   admixing 0.5–200 parts by weight of a polymerizable monomer with said latex;
   coagulating the solids in said latex, said solids including said monomer and said elastomer polymer, said admixing and coagulating being effected with substantially no polymerization of said monomer and substantially no crosslinking of or grafting onto said elastomeric polymer;
   separating said coagulated solids from the aqueous phase as a homogeneous non-crosslinked elastomeric composition;
   compounding said non-crosslinked elastomeric composition with a vulcanizing agent for said elastomeric polymer and a polymerization initiator for said without polymerization and vulcanization monomer;
   compounding with a filler;
   shaping to form a cover on a metal core; and then the polymerization and vulcanization to cure the shaped product.

2. The process of claim 1 wherein said vulcanizing agent and said polymerization initiator are the same free radical initiator.

3. The process of claim 1 wherein said vulcanizing agent includes sulfur and said polymerization initiator is a free radical initiator.

4. The process of claim 1 wherein the weight ratio of monomer to polymer is within the range of 2:5 to 1:2.

5. The process of caim 1 wherein said polymeric elastomer is a copolymer of butadiene and acrylonitrile.

6. The process of claim 4 wherein said polymeric elastomer is a copolymer of butadiene and acrylonitrile.

7. The process of claim 1 wherein said polymeric elastomer is a carboxylated copolymer of butadiene and acrylonitrile.

8. The process of claim 4 wherein said polymeric elastomer is a carboxylated copolymer of butadiene and acrylonitrile.

9. The process of claim 5 wherein said monomer is an acrylic or methacrylic ester of a polyol.

10. the process of claim 6 wherein said monomer is an acrylic or methacrylic ester of a polyol.

11. The process of claim 7 wherein said monomer is an acrylic or methacrylic ester of a polyol.

12. The process of claim 8 wherein said monomer is an acrylic or methacrylic ester of a polyol.

* * * * *